United States Patent [19]

Borchers et al.

[11] Patent Number: 5,587,412
[45] Date of Patent: Dec. 24, 1996

[54] ESTERIFIED STARCH COMPOSITION

[75] Inventors: Gerd Borchers, Wehr; Ingo Dake, Hamburg; Albrecht Dinkelaker, Rheinfelden, all of Germany; Jean-Pierre Sachetto, Arlesheim, Switzerland; Richard Zdrahala, Montville, N.J.; Stephen Rimsa, Lebanon, N.J.; Gary Loomis, Morris Township, N.J.; Paul Tatarka, Peoria, Ill.; Olivier Mauzac, Seppois-le-Bas, France

[73] Assignee: National Starch and Chemical Investment Holding Corporation, Wilmington, Del.

[21] Appl. No.: 313,072

[22] PCT Filed: Mar. 26, 1993

[86] PCT No.: PCT/US93/02822

§ 371 Date: Feb. 6, 1995

§ 102(e) Date: Feb. 6, 1995

[87] PCT Pub. No.: WO93/20110

PCT Pub. Date: Oct. 14, 1993

Related U.S. Application Data

[63] Continuation of Ser. No. 948,750, Sep. 22, 1992, abandoned, and a continuation-in-part of Ser. No. 938,107, Aug. 28, 1992, abandoned, and a continuation-in-part of Ser. No. 936,175, Aug. 26, 1992, abandoned, which is a continuation-in-part of Ser. No. 860,820, Mar. 31, 1992, abandoned, and a continuation-in-part of Ser. No. 860,914, Mar. 31, 1992, abandoned.

[51] Int. Cl.$^6$ ....................................... C08B 33/02
[52] U.S. Cl. .......................... 524/47; 536/107; 536/110
[58] Field of Search .............................. 524/47; 536/107, 536/110

[56] References Cited

U.S. PATENT DOCUMENTS 5,314,754  5/1994  Knight ................................. 478/532

FOREIGN PATENT DOCUMENTS 964799  7/1964  United Kingdom.
92/19675  11/1992  WIPO.

OTHER PUBLICATIONS

Wolff et al "Mixed Esters of Amylose" Industrial and Engineering Chemistry, vol. 49, No. 8, Aug. 1957, pp. 1247–1248.

*Primary Examiner*—Nathan M. Nutter
*Attorney, Agent, or Firm*—Eugene Zagarella, Jr.

[57] ABSTRACT

According to the present invention there is provided a composition as obtained from a melt comprising esterified starch, preferably having an amylose content of at least about 50% by weight with respect to that of the starch, and being substituted to a degree of at least about 1.5, preferably from about 1.8 to about 2.9. The starch ester may be of the kind obtained by reaction of a mixed acid anhydride with starch.

15 Claims, No Drawings

ESTERIFIED STARCH COMPOSITION

This application is a continuation of application Ser. No. 948,750 filed Sep. 22, 1992, now abandoned a continuation-in-part of application Ser. No. 938,107 filed Aug. 28, 1992 and now abandoned, a continuation-in-part of application Ser. No. 936,175 filed Aug. 26, 1992, now abandoned which is a continuation-in-part of application Ser. No. 860,820 filed Mar. 31, 1992 and now abandoned, and a continuation-in-part of application Ser. No. 860,914 filed Mar. 31, 1992 and now abandoned.

FIELD OF THE INVENTION

The present invention relates to degradable polymer compositions capable of being formed by heat and pressure into articles having good dimensional stability and physical properties. These compositions comprise an esterified starch preferably having a degree of substitution of at least about 1.5 and preferably an amylose content of at least about 50%.

BACKGROUND TO THE INVENTION

It is known that starch may be heated under pressure to form a melt suitable for the production of shaped articles. Such starch-based shaped articles may exhibit the disadvantages of relatively poor physical properties under high relative humidity conditions and a relatively high tendency to embrittlement under relatively low humidity conditions.

Attempts to overcome these problems by the replacement of the above mentioned starch by maize starch esters having a low degree of substitution, as commonly found in the starch industry, have generally been unsuccessful, often resulting in weak, brittle, hydrophilic materials having a poor balance of physical properties. It is an object of the present invention to overcome, at least in part, the above mentioned disadvantages.

SUMMARY OF THE INVENTION

According to the present invention there is provided a composition as obtained from a melt comprising esterified starch having a degree of substitution of at least about 1.5.

The esterified starch may be selected from the group consisting $C_2$ to $C_{22}$ -starch esters preferably from the group consisting of starch acetates, starch propionates, starch butyrates, starch pentanoates, and starch hexanoates, and mixtures thereof.

The starch ester may be a mixed ester, i.e. having different kinds of ester groups attached to the same molecule, as are obtained for example by reaction of starch with a mixed acid anhydride or a mixture of different acid anhydrides. Such a mixed acid anhydride may be for example an acid anhydride made from acetic acid and propionic acid; a mixture of different acid anhydrides may be for example a mixture of acetic acid anhydride and propionic acid anhydride.

The esterified starch as used in this invention may be made from a starch as obtained from potatoes, rice, tapioca, corn, pea, rye, oats, and wheat with the respective known amylose content. However, the amylose content of the starch is preferably at least about 50% by weight with respect to that of the starch.

The composition may further include one or more members selected from the group consisting of extenders; fillers; wood derived materials; oxides of magnesium, aluminum, silicon, and titanium; lubricants; mold release agents; plasticisers; stabilisers; colouring agents; flame retardants; boron-containing compounds; alkali and alkaline earth metal salts; thermal stabilisers; and melt flow accelerators; and mixtures thereof.

The invention further provides the composition according to this invention when shaped into articles, for example bottles, strands, sheets, films, packaging materials, pipes, cups, rods, laminated films, sacks, bags, pharmaceutical capsules, foams, granulates and powders by a process including injection molding, compression molding, filming, blow molding, vacuum forming, thermoforming, extrusion, extrusion moulding, co-extrusion, foaming, profile extrusion and combinations thereof.

The invention still further provides the composition of the present invention in the form of a melt.

The invention still further provides a process for forming said melt comprising heating an esterified starch having a degree of substitution of at least about 1.5, optionally in the presence of a plasticiser to an elevated temperature and plastifying the thus heated composition until a uniform melt is obtained.

The present invention still further provides the use of an esterified starch having a degree of substitution of at least about 1.5, and preferably also an amylose content of at least about 50% by weight with respect to that of the starch, as a component in a thermoplastic melt.

The present invention will be further apparent from the following description taken in conjunction with the accompanying examples and appended claims.

DETAILED DESCRIPTION OF THE INVENTION

The present invention provides a composition as obtained from a melt comprising esterified starch having a degree of substitution of substitution of at least 1.5.

The esterified starch is selected from the group consisting of $C_2$ to $C_{22}$ starch esters and preferably is a $C_2$ to $C_8$ starch esters.

It is particularly preferred that the esterified starch is a starch acetate, starch propionate, starch butyrate, starch pentanoate, and/or a starch hexanoate, and/or a mixture thereof.

Most particularly preferred are the esters having more than 2-carbon atoms in the alkylcarbonyl residue.

The starch ester may be a mixed ester comprising at least two different types of alkylcarbonyl groups (i.e. of different lengths) in the same molecule and as such may be of the kind as obtained by reaction of starch with a mixed anhydride or with a mixture of different acid anhydrides.

It is most preferred that such mixed starch esters comprise at least two members selected from the group consisting of acetate, propionate, butyrate, pentanoate, hexanoate, heptanoate and octanoate residues bound to the same molecule.

Particularly preferred starch diesters comprise both acetate and propionate groups or both acetate and butyrate groups or both propionate and butyrate groups or both pentanoate and butyrate groups bound to the same molecule.

In the case of starch diesters, the ratio of the types of ester groups comprised by the starch ester may vary greatly, but preferably is in the range of about 1:1 to about 1:20.

The degree of the total substitution of the esterified starch is from about 1.5 to about 2.9, and it is more preferred that the degree of substitution is from about 1.8 to about 2.9, independent of the type of substitution. The most preferred degree of substitution is from about 1.8 to about 2.5.

Examples of starch esters are given in Table 1.

TABLE 1

| Example No. | starch type | ester type | degree of substitution |
|---|---|---|---|
| 1. | corn | acetate | 1.75 |
| 2. | corn | acetate | 2.58 |
| 3. | corn | propionate | 1.84 |
| 4. | corn | propionate | 2.47 |
| 5. | Hylon VII* | acetate | 1.83 |
| 6. | Hylon VII* | acetate | 2.34 |
| 7. | Hylon VII* | acetate | 2.81 |
| 8. | Hylon VII* | propionate | 1.89 |
| 9. | Hylon VII | propionate | 2.55 |

*Hylon VII is a high amylose corn starch with an amylose content of about 70%, sold by National Starch and Chemical Co, USA.

Examples of mixed starch esters are given in Table 2.

TABLE 2

* = degree of substitution    pro'ate = propionate
corn** = Hylon VII    but'rate = butyrate

| Ex. Nr. | starch type | amylose content | ester type (1) | ester type (2) | ratio ester 1 : ester 2 | total DS* |
|---|---|---|---|---|---|---|
| 10. | corn | 27% | acetate | pro'ate | 25:75 | 2.36 |
| 11. | corn | 27% | acetate | pro'ate | 50:50 | 1.85 |
| 12. | corn | 27% | acetate | pro'ate | 75:25 | 1.60 |
| 13. | corn | 27% | acetate | but'ate | 05:95 | 1.82 |
| 14. | corn | 27% | acetate | but'ate | 40:60 | 2.05 |
| 15. | corn | 27% | acetate | but'ate | 95:05 | 2.59 |
| 16. | corn** | 70% | acetate | pro'ate | 25:75 | 2.06 |
| 17. | corn** | 70% | acetate | pro'ate | 50:50 | 1.84 |
| 18. | corn** | 70% | acetate | pro'ate | 75:25 | 1.77 |
| 19. | corn** | 70% | acetate | but'ate | 05:95 | 1.87 |
| 20. | corn** | 70% | acetate | but'ate | 40:60 | 2.06 |
| 21. | corn** | 70% | acetate | but'ate | 95:05 | 2.73 |

Within the scope of this invention, any type of commercially available starch to produce the esterified starch may be used such as native starch selected from potatoes, rice, tapioca, corn, pea, rye, oats, maize, barley and wheat. However it is preferred that the amylose content of the starch is at least about 50% and preferably is higher than this, typically being in the range of about 70% by weight with respect to that of the starch.

A highly suitable starch is the high amylose genetically modified corn starch, Hylon VII, having an amylose content of about 75%, available from National Starch and Chemical Company of Finderne Avenue, Bridgewater, N.J. 08807, USA. Such starch is subsequently esterified, e.g. acetylated or propionated to a degree of substitution of at least 1.5. and preferably 1.8.

A particularly suitable esterified high amylose starch is Hylon VII acetylated or propionated, preferably propionated, to a degree of 2.3.

Whilst the substituted high amylose starches present in the inventive compositions are thermoplastic per se, ie in the absence of an added plasticiser, the composition may advantageously further comprise a plasticiser by which the melting temperature of the esterified starch may be reduced and the processability thereof improved.

The plasticiser may have a molecular weight of less than 2,000, and it is preferred that the molecular weight is between about 100 and about 1,000.

Some preferred plasticisers may be summarized by the formula:

$$A\,(COOR)_m(OOCR_1)_n \qquad (I)$$

wherein: A is a saturated or unsaturated aliphatic or alicyclic residue; n is an integer from zero to 8; m is an integer from zero to 6; whereby the sum of m+n is an integer from 1 to 6, and R and $R_1$ are, independently of each other, a saturated or unsaturated aliphatic or alicyclic residue having from 1 to 20 carbon atoms.

In one embodiment of compound (I), A is a saturated aliphatic residue having 2 to 8 carbon atoms; m is an integer from zero to 4; n is 0, 1, 2 or 3; the sum of m+n is 2 to 4; and R, and $R_1$ are independent of each other and are alkyl residues having from 1–6 carbon atoms. In a more preferred embodiment of compound (I), A is a saturated aliphatic residue having 2, 3, or 4 carbon atoms; m is an integer from zero to 4; n is 0, 1 or 2; the sum of m+n is 2 to 4; and R and $R_1$ are independent of each other are alkyl residues having 1, 2, 3 or 4 carbon atoms.

Compound (I) may be an ester derivative of at least one of the following members:

i) $OH-CH_2-(C(COOH)H)_q-CH_2OH$
ii) $HOOC-CH_2-(C(COOH)H)_r-CH_2-COOH$
iii) $HOOC-CH_2-(C(COOH)OOCR_2))-CH_2-COOH$
iv) $HOOC-CH_2-CH((COOH)(COOH)H)$
v) $C(CH_2COOH)_4$
vi) $(HOCH_2)_3C-O-C(CH_2OH)_3$
vii) $HO-CH_2-(CHOH)_q-CH_2OH$ wherein: q and r are independently of each other 1, 2, 3 or 4 and $R_2$ is methyl or propyl.

Compound (I) may be a methyl, ethyl, propyl, or butyl carboxylate ester of a member selected from the group consisting of:

ii) $HOOC-CH_2-(C(COOH)H)_r-CH_2-COOH$
iii) $HOOC-CH_2-(C(COOH)\,(OOCR_2))-CH_2-COOH$
iv) $HOOC-CH_2-CH((COOH)\,(COOH)H)$ where $R_2$ is methyl or propyl.

In one embodiment of compound (I) it is preferred that the carboxylate ester is a tri-ethyl or tri-butyl carboxylate ester of:

$$HOOC-CH_2-(C(COOH)OOCR_2)-CH_2-COOH$$

where $R_2$ is methyl or propyl, and it is most preferred that compound (I) is selected from the group consisting of $$H_5C_2-OOC-CH_2-(C(COOC_2H_5)OOCCH_3)-CH_2-COOC_2H_5.$$

and $$H_9C_4-OOC-CH_2-(C(COOC_4H_9)OOCCH_3)-CH_2-COOC_4H_9.$$

Such most preferred compounds are known, and are, for example, sold under the Tradename of Citroflex A-2 plasticisers by Pfizer AG of Fluelastrasse 7, Postfach 2, 8048 Zuerich, Switzerland.

Another embodiment of compound (I) takes the form of a mono, di or tri ester of:

$$HO-CH_2-CHOH-CH_2OH,$$

viz the mono-, di-, or tri- acetate of glycerol.

It is most particularly preferred that compound (I) is the tri-acetate of glycerol, viz:

$$CH_3COOCH_2-(CH(OOCCH_3))-CH_2OOCCH_3$$

Compound (I) may also be a diacetate-monopropionate or dipropionate-monoacetate of glycerol or the diacetate or dipropionate of OH—CH$_2$—C(COOH)H—CH$_2$OH, or it may be selected from the trimethyl ester and tripropyl ester of:

HOOC—CH$_2$—CH(COOH)COOH.

A further preferred plasticiser has the general formula:

A(OH)$_x$(COOR)$_y$(OOCR$_1$)$_z$    (II)

wherein A is a saturated aliphatic residue having 2 to 8 carbon atoms; x is one or two; y is an integer from zero to 4; z is an integer from zero to 4; the sum of y+z is 2 to 4; and R and R$_1$ are independent of each other and are alkyl residues having from 1–6 carbon atoms.

In a more preferred embodiment of compound (II), A is a saturated aliphatic residue having 2, 3, or 4 carbon atoms; x is one or two; y is an integer from zero to 4; z is an integer from zero to 4; the sum of y+z is 2 to 4; and R and R$_1$ are independent of each other are alkyl residues having 1, 2, 3 or 4 carbon atoms.

Compound (II) may be an ester derivative of at least one of the following members:

i) OH—CH$_2$—(CHOH)$_q$—CH$_2$OH
ii) HOOC—CH$_2$—(CHOH)$_r$—CH$_2$—COOH
iii) HOOC—CH$_2$—(C(COOH)OH)—CH$_2$—COOH
iv) HOOC—CH$_2$—CH(COOH)OH
v) C(CH$_2$OH)$_4$
vi) (HOCH$_2$)$_3$C—O—C(CH$_2$OH)$_3$ wherein: q and r are independently of each other 1, 2, 3 or 4.

It is preferred that compound (II) is a methyl, ethyl, propyl or butyl carboxylate ester of a member selected from the group consisting of:

ii) HOOC—CH$_2$—(CHOH)$_r$—CH$_2$—COOH
iii) HOOC—CH$_2$—(C(COOH)OH)—CH$_2$—COOH
iv) HOOC—CH$_2$—CH(COOH)OH It is more preferred that the carboxylate ester is an ethyl or butyl ester, and it is most preferred that the compound is a tri-ethyl or tri-butyl carboxylate ester of:

HOOC—CH$_2$—(C(COOH)OH)—CH$_2$—COOH.

Accordingly, the most preferred compounds of formula (II) have the formulae:

H$_5$C$_2$—OOC—CH$_2$—(C(COOC$_2$H$_5$)OH)—CH$_2$—COOC$_2$H$_5$ or

H$_9$C$_4$—OOC—CH$_2$—(C(COOC$_4$H$_9$)OH)—CH$_2$—COOC$_4$H$_9$.

Such most preferred compounds are known, and are, for example, sold under the Tradename of Citroflex plasticisers by Pfizer AG of Fluelastrasse 7, Postfach 2, 8048 Zuerich, Switzerland.

Other forms of compound (II) for use according to the present invention include the diacetate and dipropionate of:

OH—CH$_2$—CHOH—CH$_2$OH, and the monoacetate-dimethyl ester and mono-acetate-dipropyl ester or mono-propionate-dipropyl ester of:

HOOC—CH$_2$—CH(COOH)OH.

The plasticiser, whether of formula (I) or (II) is present in the composition in an amount of from about 3% to about 60% by weight based on the weight of the composition. It is more preferred that the concentration of such plasticiser is from about 5% to about 30%, and most preferred that the said concentration is from about 8% to about 18% by weight based on the weight of the composition.

Other suitable plasticisers include dimethyl phthalate, diethyl phthalate, dibutyl phthalate, dihexyl phthalate, di-2-ethylhexyl phthalate, di-n-octyl phthalate, di-isooctyl phthalate, di-isonyl phthalate, di-isodecyl phthalate, dicyclohexylphthalate, dimethylcyclhexyl phthalate, dimethylglycol phthalate, trichloroethyl phosphate, cresyl di phenyl phosphate, triphenyl phosphate, tri-cresyl phosphate, triacetyl citrate, triethyl acetyl citrate, triethylene glycol di (2-ethylbutyrate), diacetin, butyl phthalylbutyl glycolate. acetylated monoglycerides, triethyl citrate, diethyl succinate, dimethyl sebacate, tributyl phosphate, di-n-hexyl azelate, di-isooctyl azelate, di-(2-ethylhexyl) azelate, dicapryl adipate, n-ethyl-o,p-toluenesulfonamide, diethyleneglycole dibenzoate, dipropylene glycol dibenzoate and mixtures thereof.

Particularly suitable plasticisers are glycerol triacetate, dimethyl sebecate, diethyl succinate, acetyl triethyl citrate, or mixtures thereof, which may be present in the composition in an amount of from about 5 to about 45% by weight with respect to that of the starch ester.

The composition may further contain extenders; fillers; wood derived materials; oxides of magnesium, aluminum, silicon, and titanium; lubricants; mold release agents; plasticisers; stabilisers; colouring agents; flame retardants; boron-containing compounds; alkali and alkaline earth metal salts; thermal stabilisers; and melt flow accelerators; and mixtures thereof.

The preferred thermal stabiliser and mold release agent are respectively butylated hydroxy toluene and stearyl stearamide which may be present in the composition in amounts respectively of from about 0.01 to about 5% and from about 0.01 to about 2%, by weight with respect to the starch ester component of the composition.

In one embodiment of the invention, the composition further comprises a native or chemically modified (non esterified) starch selected from potatoes, rice, tapioca, corn, pea, rye, oats, and wheat.

A method of preparing the melt from which the present inventive composition is obtained comprises heating an esterified starch, having a degree of substitution of at least about 1.5, and preferably having an amylose content of at least about 50% by weight with respect to that of the starch, optionally in the presence of a plasticiser The invention will be further apparent from the following Examples.

EXAMPLE 1

The following formulation is prepared:
1000 grams of Hylon VII starch acetate having a degree of substitution of 2.0; 300 grams of glycerol triacetate; 5 grams of butylated hydroxy toluene and 3 grams of Stearyl Stearamide.

The mixture is thoroughly blended in an intensive mixer of the Henschel variety such as is known to the skilled man. Following blending, the mixture is allowed to rest for at least 24 hours.

The thus blended mixture is then extruded on a Berstorff twin screw extruder on which a stock temperature of 160° C. (320 F.) is maintained. The extrudate is then cooled and pelletised.

The thus cooled pellets are then placed in the hopper of a 170 CMD Arburg injection moulding machine. The temperature zones are set as follows:

Zone 1: 127° C. (260 F.)

Zone 2: 154° C. (310 F.)

Zone 3: 154° C. (310 F.) and tensile test pieces are produced at an injection molding pressure of about 550 bar. The thus produced test pieces are translucent and exhibit excellent flexibility and toughness.

EXAMPLE 2

The above Example is repeated except that the formulation contains the thermal stabiliser (butylated hydroxy toluene) at a concentration of between 0.05 and 2.0% by weight based on the weight of the starch ester. Similar tensile test pieces likewise having improved properties are produced.

EXAMPLE 3

Example 2 is repeated except that the amount of plasticiser (glycerol triacetate) is varied from 5 to 45% by weight with respect to that of the starch ester in the composition. Similar tensile test pieces likewise having improved properties are produced.

EXAMPLE 4

Example 2 is repeated except that the mold release agent (stearyl stearamide) concentration is increased to 1% by weight with respect to that of the total composition.

EXAMPLE 5

Examples 1 to 4 are repeated except that the degree of substitution of the starch acetate is varied from 1.5 to 2.9. Similar tensile test pieces likewise having improved properties are produced.

The above Examples demonstrate the extrusion and injection mouldability of the present inventive compositions, which may be shaped into articles such as bottles, strands, sheets, films, packaging materials, pipes, cups, rods, laminated films, sacks, bags, pharmaceutical capsules, foams, granulates and powders by processes which include injection molding, compression molding, filming, blow molding, vacuum forming, thermoforming, extrusion, extrusion moulding, co-extrusion, foaming, profile extrusion and combinations thereof.

It will be appreciated that it is not intended to limit the invention to the above examples only, many variations thereto and modifications thereof being possible to one skilled in the art without departing from scope of the invention, which is defined by the appended claims.

What we claim is:

1. A composition obtained from a melt comprising esterified starch having a degree of substitution of from about 1.8 to about 2.9, wherein the ester group of the esterified starch is selected from the group consisting of $C_2$ to $C_8$ ester residues and mixtures thereof.

2. The composition according to claim 1, wherein the esterified starch is selected from the group consisting of starch acetates, starch propionates, starch butyrates, starch pentanoates, starch hexanoates, and mixtures thereof.

3. The composition according to claim 1, wherein the starch ester has more than 2 carbon atoms in its alkyl-carbon residue.

4. The composition according to claim 1, wherein the starch ester is obtained by reaction of starch with a mixed acid anhydride or with a mixture of different acid anhydrides.

5. The composition according to claim 4 wherein the starch ester comprises at least two members bound to a common starch molecule selected from the group consisting of acetate, propionate, butyrate, pentanoate, hexanoate, heptanoate and octanoate.

6. The composition according to claim 5, wherein there are two members present in a ratio of from about 1:1 to 1:20.

7. The composition according to claim 1, wherein the degree of substitution is from about 1.8 to about 2.5.

8. The composition according to claim 1, wherein the amylose content is at least about 50%.

9. The composition according to claim 1, wherein the amylose content is at least about 70%.

10. The composition according to claim 1, further comprising a member selected from the group consisting of extenders; fillers; wood derived materials; oxides of magnesium, aluminum, silicon, and titanium; lubricants; mold release agents; plasticizers; stabilizers; coloring agents; flame retardants; boron-containing compounds; alkali and alkaline earth metal salts; thermal stabilizers; melt flow accelerators; and mixtures thereof.

11. The composition according to claim 10, wherein the plasticizer is present in an amount of from 5 to 45% by weight with respect to that of the starch ester and is selected from the group consisting of glycerol triacetate (triacetin), dimethyl phthalate, diethyl phthalate, dibutyl phthalate, dihexyl phthalate, di-2-ethylhexyl phthalate, di-n-octyl phthalate, di-isoctyl phthalate, di-isonyl phthalate, di-isodecyl phthalate, dicyclohexylphthalate, dimethylcyclhexyl phthalate, dimethylglycol phthalate, trichlorethyl phosphate, cresyl diphenyl phosphate, triphenyl phosphate, tri-cresyl phosphate, triacetyl citrate, triethyl acetyl citrate, triethylene glycol di-(2-ethylbutyrate), diacetin, butyl phthalylbutyl glycolate, acetylated monoglycerides, triethyl citrate, diethyl succinate, dimethyl sebacate, tributyl phosphate, di-n-hexyl azelate, di-isooctyl azelate, di-(2-ethylhexyl) azelate, dicapryl adipate, n-ethyl-o or p-toluenesulfonamide, diethyleneglycol dibenzoate, dipropylene glycol dibenzoate and mixtures thereof.

12. The composition according to claim 10, wherein the thermal stabilizer and mold release agent are present in the composition in amounts respectively of from about 0.01 to about 5% and from about 0.01 to about 2%, by weight with respect to the starch ester components of the composition.

13. The composition according to claim 1, further comprising a native or chemically modified (non esterified) starch selected from potatoes, rice, tapioca, corn, pea, rye, oats, and wheat.

14. The composition of claim 1, shaped into articles.

15. The process for forming the melt of claim 1 comprising the steps of heating an esterified starch having a degree of substitution at least about 1.8, optionally in the presence of a plasticizer to an elevated temperature and plasticizing the heated composition until a uniform melt is obtained.

* * * * *